United States Patent [19]

Fukui

[11] 4,114,737
[45] Sep. 19, 1978

[54] DRIVE CONTROLLING MECHANISM
[75] Inventor: Kiyozumi Fukui, Gifu, Japan
[73] Assignee: Teijin Seiki Company Limited, Osaka, Japan
[21] Appl. No.: 750,537
[22] Filed: Dec. 14, 1976
[30] Foreign Application Priority Data Dec. 18, 1975 [JP] Japan .......................... 50-171224[U]

[51] Int. Cl.² ........................ B60T 17/04; B60K 3/02; F01B 13/06
[52] U.S. Cl. .................................. 192/3 N; 91/499; 180/66 F
[58] Field of Search ....................... 192/3 N; 417/291; 188/66 F; 91/499

[56] References Cited
U.S. PATENT DOCUMENTS

| 2,445,585 | 7/1948 | Shaff | 192/3 N |
|---|---|---|---|
| 2,743,708 | 5/1956 | Lungerhausen | 192/3 N |
| 2,823,775 | 2/1958 | Zwayer | 192/3 N |
| 3,439,766 | 4/1969 | Dence et al. | 180/66 F |
| 3,640,069 | 2/1972 | Sugahara et al. | 417/291 |
| 3,771,627 | 11/1973 | Caldwell et al. | 192/3 N |
| 3,799,302 | 3/1974 | Workman | 192/3 N |
| 3,912,057 | 10/1975 | Krouse | 192/3 N |

Primary Examiner—William L. Freeh
Attorney, Agent, or Firm—Cushman, Darby & Cushman

[57] ABSTRACT

A drive controlling mechanism comprises in combination: a hydraulic motor including a cylinder block, and a rotary shaft extending axially of and positioned within the cylinder block to be engaged with the cylinder block for rotation therewith; a motor housing for accommodating therein the hydraulic motor; a control block securely connected with the motor housing and rotatably receiving one end portion of the rotary shaft; a parking brake arrangement detachably received within the axially outer half of the control block for being capable of braking the rotary shaft; a control valve arrangement detachably mounted on the outer peripheral wall of the control block in fluidal communication with the parking brake arrangement by way of a shuttle valve accommodated in a radial bore formed in the control block so that the hydraulic motor is controlled to be driven by the control valve arrangement; and a pair of inlet-outlet conduits for introducing a pressure oil to the control valve arrangement and discharging the pressure oil from the control valve arrangement.

3 Claims, 7 Drawing Figures

DRIVE CONTROLLING MECHANISM

This invention relates to a drive control mechanism and, in particular, to a drive control mechanism comprising a parking brake arrangement and a control valve arrangement which are adapted to be arranged within the width of an endless belt for driving a crawler type travelling vehicle such as bulldozer, shovel loader and so on.

There have been proposed a variety of such control mechanisms in all of which the parking brake arrangement and the control valve arrangement were not attached to a valve block of a hydraulic motor but to a vehicle body and connected with each other by means of pipes. The parking brake arrangement, the control valve arrangement, and the pipes were usually projected from the endless belt, which frequently resulted in damages thereto when they collided with hard obstacles upon running of the vehicle body.

It is an object of the present invention to provide a drive control mechanism which overcomes the previously mentioned drawbacks by arranging the parking brake arrangement, the control valve arrangement, and the pipes within the endless belt.

It is another object to provide a drive control mechanism in which the parking brake arrangement and the control valve arrangement are detachably mounted on the valve block of the hydraulic motor for facilitating assembling and disassembling of the drive control valve.

The above objects are attained by a drive controlling mechanism of the present invention which comprises in combination: a hydraulic motor including a cylinder block, and a rotary shaft extending axially of and positioned within the cylinder block to be engaged with the cylinder block for rotation therewith; a motor housing for accommodating therein the hydraulic motor; a control block securely connected with the motor housing and rotatably receiving one end portion of the rotary shaft; a parking brake arrangement detachably received within the axially outer half of the control block for being capable of braking the rotary shaft; a control valve arrangement detachably mounted on the outer peripheral wall of the control block in fluidal communication with the parking brake arrangement by way of a shuttle valve accommodated in a radial bore formed in the control block so that the hydraulic motor is controlled to be driven by the control valve arrangement; and a pair of inlet-outlet conduits for introducing a pressure oil to the control valve arrangement and discharging the pressure oil from the control valve arrangement. The control valve arrangement may include a first change-over valve communicated with the inlet-outlet conduits to stop introduction and discharge of the pressure oil to and from the hydraulic motor upon stoppage of the introduction of the pressure oil into the hydraulic motor, and a second change-over valve communicated with the first change-over valve to circulate the pressure oil within the hydraulic motor upon stoppage of introduction of the pressure oil into the hydraulic motor.

The above and other objects, features and advantages of the present invention will become clear from the following particular description of the invention and the appended claims, taken in conjunction with the accompanying drawings which show by way of example a preferred embodiment of the present invention.

Figure 1:
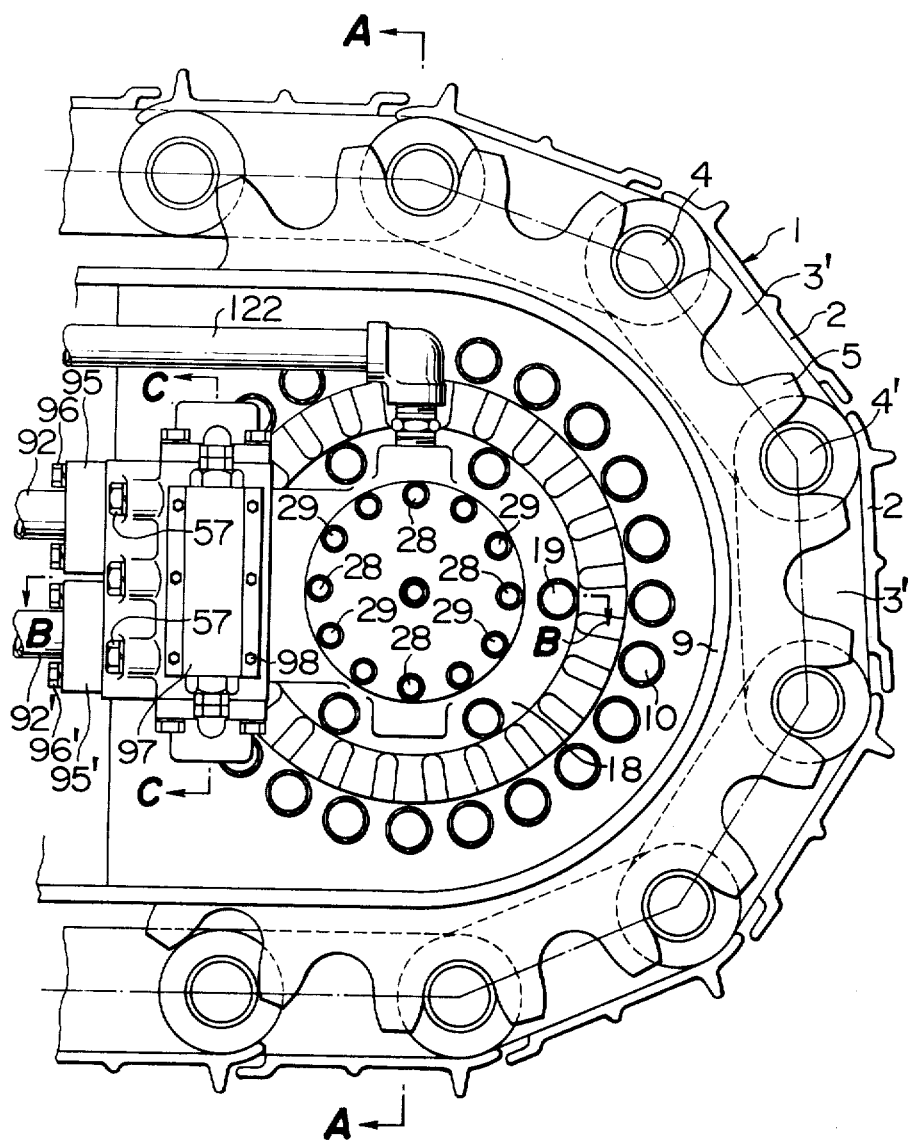
FIG. 1 is a side view of a drive controlling mechanism embodying the present invention.
Figure 2:
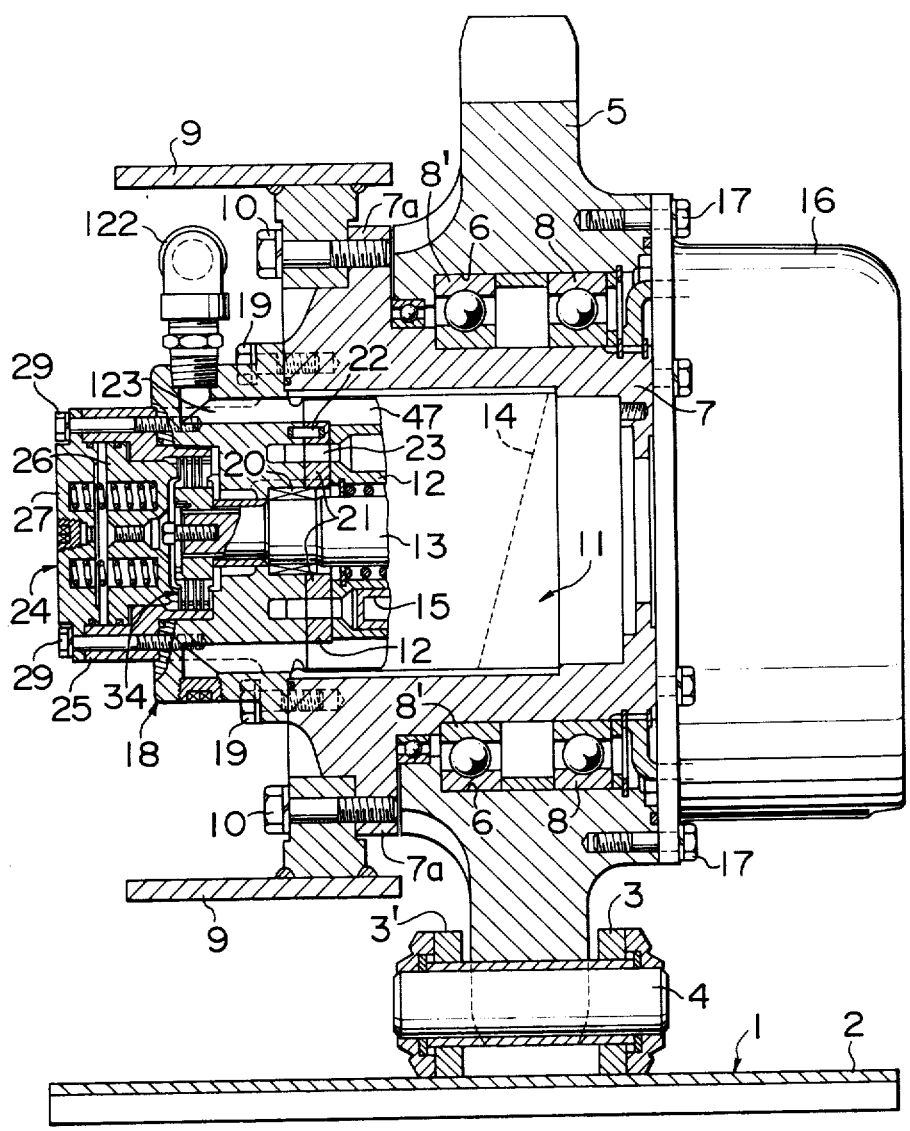
FIG. 2 is a cross-sectional view as seen from the lines A—A indicated in FIG. 1.
Figure 3:
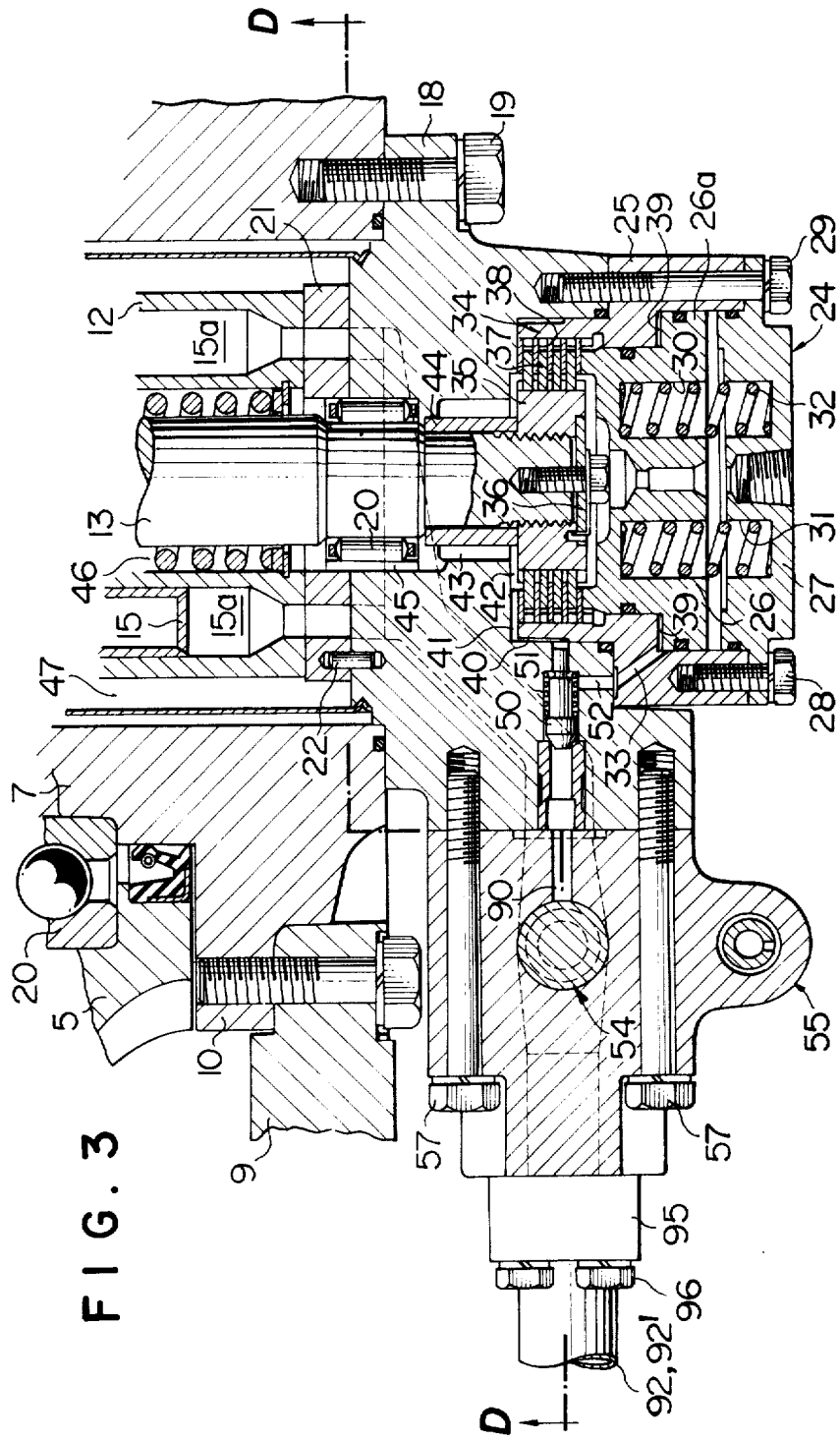
FIG. 3 is a cross-sectional view as seen from the lines B—B indicated in FIG. 1.
Figure 7:
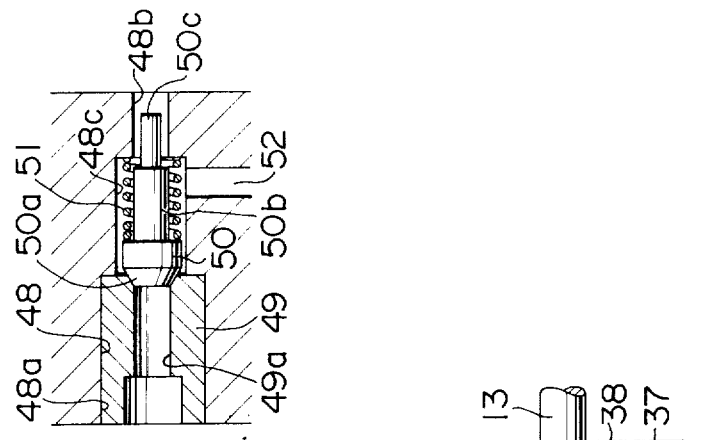
FIG. 7 is an enlarged cross-sectional view of parts around a shuttle valve as shown in FIG. 3.
Figure 6:
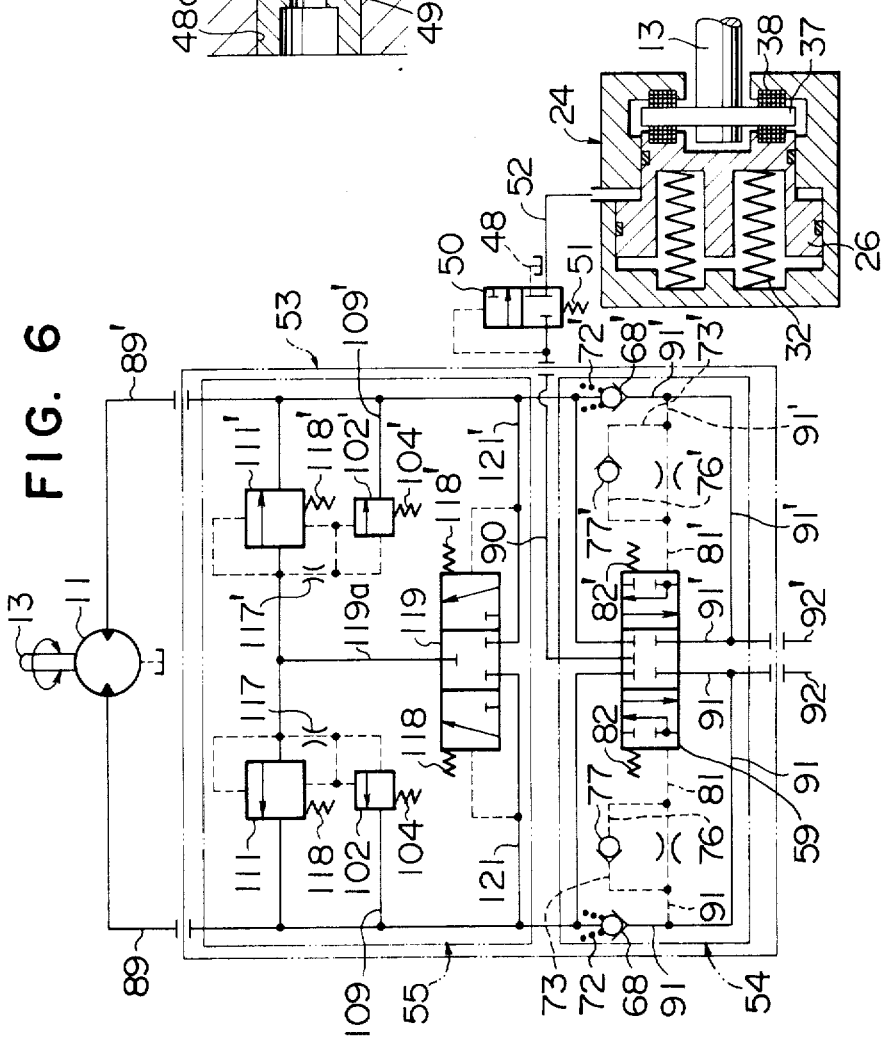
FIG. 6 is an oil circuit showing circulation of a pressure oil in the drive controlling mechanism.

Referring now to the drawings and particularly to FIGS. 1, 2 and 3, there is shown an endless belt, generally indicated at 1, which comprises a number of segments 2 each having at its inner wall a pair of spaced parallel legs 3 and 3'. A pair of pins 4 and 4' are rotatably carried on the legs 3 and 3' in spaced and parallel relation with each other along the travelling direction of the segments 2 and each pin connects adjacent two segments 2 to constitute the endless belt 1 as a whole. A sprocket wheel 5 is engageable with the pins 4 and 4' to drive the endless belt 1 through the legs 3 and 3', and has an axial bore 6 in which a motor housing 7 is inserted to rotatably support the sprocket wheel 5 through bearings 8 and 8'. On the rear outer peripheral wall is integrally formed a flange portion 7a which is attached to a fixed frame 9 by means of bolts 10. The motor housing 7 is adapted to accommodate therein a hydraulic motor, generally indicated at 11, which includes a cylinder block 12, and a rotary shaft 13 extending axially of and positioned within said cylinder block 12 to be splinedly engaged with the cylinder block 12 for rotation therewith. An inclined plate 14 is accommodated within the hydraulic motor 11 to be engaged with a plurality of pistons 15 slidably received in the cylinder block 12. On the fore face is securely mounted a reduction gear unit 16, by means of bolts 17, which is drivably connected with the fore end portion of the rotary shaft 13 so that the sprocket wheel 5 is rotated through the reduction unit 16 by the rotary shaft 13 when the hydraulic motor 11 is driven by a pressure oil. A control block, generally indicated at 18, is securely connected to the rear face of the motor housing 7 by means of bolts 19 to rotatably receive the rear end portion of the rotary shaft 13 through a bearing 20. Between the rear face of the cylinder block 12 and the fore face of the control block 18 is interposed a timing plate 21 which is coupled with the control block 18 by pins 22 and which has a plurality of arcuate bores 23 circumferentially aligned and equidistantly spaced with each other to be communicatable with a plurality of cylinder bores 15a each slidably receiving the piston 15. A parking brake arrangement, generally represented at 24, comprises a receiving member 25, a movable member 26 axially movably received in the receiving member 25 and having at its rear end a piston portion 26a and a covering member 27 covering the movable member 26. The receiving member 25 and the covering member 27 are detachably connected to each other by hour bolts 28 and are also detachably connected to the control block 18 by a number of bolts 29. The movable member 26 is formed with a plurality of recesses 30 axially extending from the rear face of the movable member 26, while the covering member 27 is also formed with a plurality of recesses 31 axially extending and opposing to the recesses 30. A plurality of compression coil springs 32 are accommodated in the recesses 30 and 31 for urging the movable member 26 toward the hydraulic motor 11. In the receiving member 25 is formed a conduit 33 having one end opened at a position forwardly of the piston portion 26a of the movable member 26 and the other end in communication with another conduit which will be apparent as the explanation proceeds. A braking device generally designated at 34 comprises a cylindrical member 35 securely mounted on the rear end of the rotary shaft 13 by means of a locking means 36, a plurality of annular inner discs 37 each having an inner peripheral face splined to the outer peripheral wall of the cylindrical member 35, and a plurality of annular outer discs 38 each of which is interposed between the annular inner discs 37 and which has an outer peripheral face splined to the inner peripheral wall of the receiving member 25. The foremost inner disc 37 is adapted to be engageable with a bottom wall formed at the fore end of the receiving member 25. The annular inner and outer discs 37 and 38 are thus engaged with each other to brake the rotary shaft 13 through the cylindrical member 35 when the pressure oil within a chamber 39 forwardly of the piston portion 26a is discharged through the conduit 33 to forwardly move the movable member 26 by the action of the compression coil springs 32. When the pressure oil is, on the other hand, introduced into the chamber 39 through the conduit 33 to urge the piston portion 26a against the compression coil springs 32, the movable member 26 is moved rearwardly so that the annular inner and outer discs 37 and 38 are disengaged from each other to enable the rotary shaft 13 to be freely rotatable. A groove 40 is formed on the outer peripheral wall of the receiving member 25 while another groove 41 is formed on the fore end of the receiving member 25 to be in communication with the groove 40. Forwardly of the cylindrical member 35 is formed a gap 42 which is in communication with the groove 41 and an annular groove 43 provided radially outwardly of a metal sleeve 44 which is interposed between the bearing 20 and the cylindrical member 35 to surround the rotary shaft 13. An axial bore 45 is formed radially outwardly of the bearing 20 to be in communication with the annular groove 43 and an annular chamber 46 defined by the cylinder block 12 and the rotary shaft 13. Between the motor housing 7 and the cylinder block 12 is provided another annular chamber 47 which is communicated with the annular chamber 46 through clearances formed by various mechanical components or elements of the hydraulic motor 11. As best shown in FIG. 7, a radial bore 48 is formed in the control block 18 to have a radially inner end opened at the groove 40 and a radially outer end opened at the outer peripheral wall of the control block 18. The radial bore 48 comprises a large diameter portion 48a at a position remote from the rotary shaft 13 to fittedly receive a bush 49, a small diameter portion 48b at a position adjacent to the rotary shaft 13, and an intermediate diameter portion 48c having radially outer and inner ends connected with the large diameter portion 48a and the small diameter portion 48b. A shuttle valve 50 comprises a tapered head 50a engageable with the radially inner end of the bush 49, a large diameter stem 50b having a radially outer end integrally formed with the tapered head 50a, and a small diameter stem 50c having a radially outer end integrally formed with the large diameter stem 50b and loosely fitted in the small diameter portion 48b of the radial bore 48 so as to permit the pressure oil to be passed through a gap formed between the small diameter portion 48b and the small diameter stem 50c. A compression coil spring 51 is accommodated in the intermediate diameter portion 48c of the radial bore 48 to surround the large diameter stem 50b so that the shuttle valve 50 is radially outwardly urged to make the tapered head 50a to be engaged with the radially inner end of the bush 49. A conduit 52 is formed in the control block 18 to have one end communicated with the conduit 33 formed in the receiving member 25 and the other end opened at the intermediate diameter portion 48c of the radial bore 48 so that the pressure oil is introduced into the chamber 39 and discharged from the chamber 39 through the conduit 33.

Figure 4:
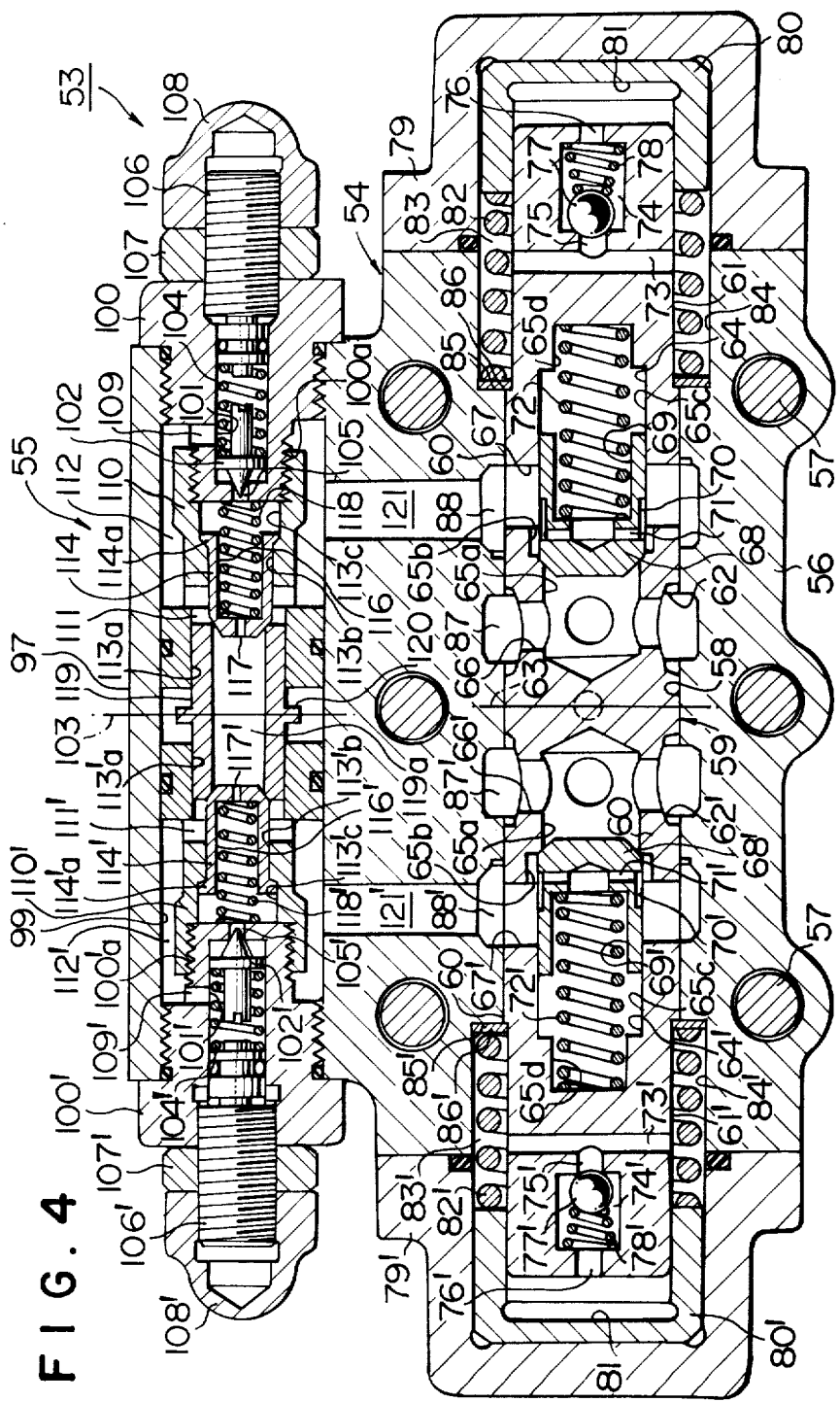
FIG. 4 is an enlarged cross-sectional view as seen from the lines C—C indicated in FIG. 1.
Figure 5:
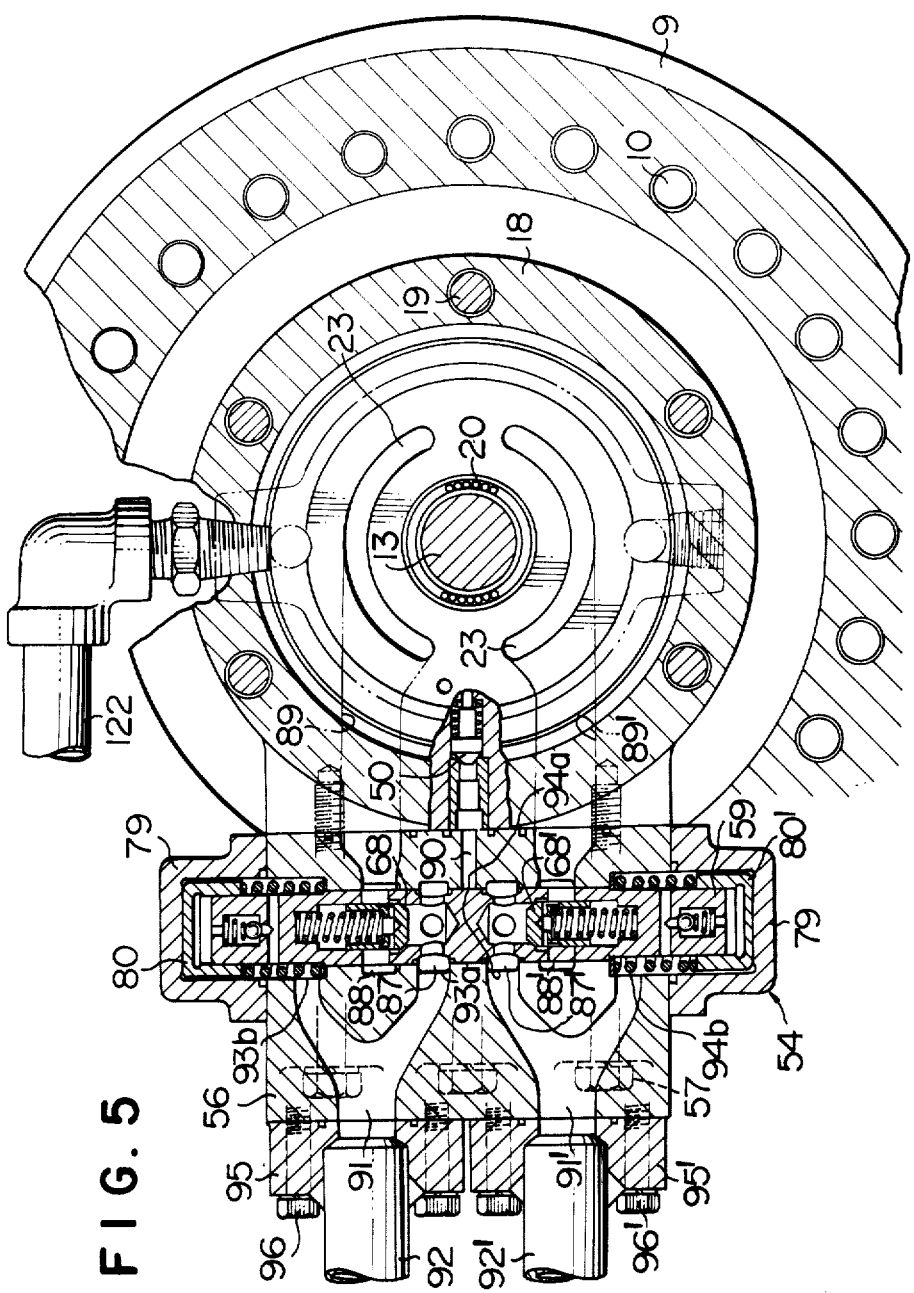
FIG. 5 is a cross-sectional view as seen from the lines D—D indicated in FIG. 3.

As shown in FIGS. 4 and 5, a control valve arrangement generally indicated at 53 comprises a first changeover valve generally designated at 54 for stopping introduction and discharge of the pressure oil to and from the hydraulic motor 11 upon stoppage of the introduction of the pressure oil into the hydraulic motor 11, and a second changeover valve, generally designated at 55, communicated with the first change-over valve 54 for circulating the pressure oil within the hydraulic motor 11 upon stoppage of introduction of the pressure oil into the hydraulic motor 11. A valve block 56 is detachably mounted on the outer peripheral wall of the control block 18 by means of bolts 57 and is formed with a valve bore 58 extending perpendicularly to the rotary shaft 13. A valve spool generally indicated at 59 is slidably received in the valve bore 58 and comprises a large diameter portion 60 and a small diameter portion 61 and 61' at the both sides of the large diameter portion 60. A pair of annular grooves 62 and 62' are formed on the outer peripheral wall of the valve spool 59 in symmetrical relation with respect to an equatorial plane 63 of the valve spool 59. A pair of axial bores 64 and 64' are formed in the valve spool 59 with respect to the equatorial plane 63 of the valve spool 59. Each of the axial bores 64 and 64' comprises a first diameter portion 65a, a second diameter portion 65b having a diameter larger than the first diameter portion 65a, a third diameter portion 65c having a substantially equal diameter to that of the first diameter portion 65a, and a fourth diameter portion 65d having a diameter smaller than that of the first diameter portion 65a, which are arranged in this order in a direction outwardly of the equatorial plane 63 of the valve spool 59. The first diameter portion 65a of the axial bore 64 is communicated with the annular groove 62 through a plurality of first radial bores 66, while the first diameter portion 65a of the axial bore 64' is also communicated with the annular groove 62' through a plurality of first radial bores 66'. The second diameter portion 65b of the axial bore 64 is communicated with the outer peripheral wall of the large diameter portion 60 of the valve spool 59 through a plurality of second radial bores 67, while the second diameter portion 65b of the axial bore 64' is communicated with the outer peripheral wall of the large diameter portion 60 of the valve spool 59 through a plurality of second radial bores 67', the second radial bores 67 and 67' being symmetrically arranged with respect to the equatorial plane 63 of the valve spool 59. A pair of check valves 68 and 68' are slidably received in the axial bores 64 and 64', respectively. The check valve 68 is formed with a recess 69 opened at a side remote from the equatorial plane 63 of the valve spool 59 and has an outer peripheral wall formed with an annular groove 70 which is in communication with the recess 69 through a plurality of radial bores 71. On the other hand, the check valve 68' is also formed with a recess 69' opened at a side remote from the equatorial plane 63 of the valve spool 59 and has an outer peripheral wall formed with an annular groove 70' which is in communication with the recess 69' through a plurality of radial bores 71'. A compression coil spring 72 is housed in the axial bore 64 to have one end engaged with the fourth diameter portion 65d of the axial bore 64 and the other end engaged with the recess 69 so that the check valve 68 is urged toward the equatorial plane 63 of the valve spool 59, while another compression coil spring 72' is housed in the axial bore 64' to have one end engaged with the fourth diameter portion 65d of the axial bore 64' and the other end engaged with the recess 69' so that the check valve 68' is urged toward the equatorial plane 63 of the valve spool 59. A pair of radial passages 73 and 73' are formed radially in the valve spool 59 axially outwardly of the axial bores 64 and 64', respectively, in symmetrical relation with the equatorial plane 63 of the valve spool 59 to extend throughout the valve spool 59 on the axial line of the valve 59. A pair of chambers 74 and 74' are formed axially in the valve spool 59 axially outwardly of the radial passages 73 and 73', respectively, in symmetrical relation with the equatorial plane 63 of the valve spool 59. The chamber 74 is communicated with the radial passage 73 through an axial bore 75 and opened at the axially outer end of the valve spool 59 through another axial bore 76, while the chamber 74' is communicated with the radial passage 73' through an axial bore 75' and opened at the axially outer end of the valve spool 59 through another axial bore 76'. A spherical valve 77 is retained in the chamber 74 to be urged toward the equatorial plane 63 of the valve spool 59 by a conical compression coil spring 78 which is similarly accommodated in the chamber 74, while a spherical valve 77' is also retained in the chamber 74' to be urged toward the equatorial plane 63 of the valve spool 59 by a conical compression coil spring 78' which is similarly accommodated in the chamber 74', with the result that the spherical valves 77 and 77' at all times close the axial bores 75 and 75', respectively. A pair of valve covers 79 and 79' are bolted to the valve block 56 to cover the axially outer end portions of the valve spool 59 and loosely receive dumper valves 80 and 80', respectively. Each of the dumper valves 80 and 80' is formed with a recess 81 which is adapted to loosely receive the axially outer end portion of the valve spool 59. A pair of compression coil springs 82 and 82' are respectively housed in annular chambers 83 and 83' defined by the small diameter portions 61 and 61' of the valve spool 59 and recesses 84 and 84' formed at the sides of the valve block 56 to urge annular ledges 85 and 85' formed between the small diameter portions 61, 61' and the large diameter portion 60 and the bottom of the recesses 84 and 84' through annular rings 86 and 86'. A pair of first annular grooves 87 and 87' are formed on the inner peripheral wall of the valve bore 58 with respect to the equatorial plane 63 of the valve spool 59 to be in communication with the annular grooves 62 and 62', respectively. On the inner peripheral wall of the valve bore 58 axially outwardly of the first annular grooves 87 and 87' with respect to the equatorial plane 63 of the valve spool 59 are formed a pair of second annular grooves 88 and 88' which are communicated with the second radial bores 67 and 67', respectively. A conduit 89 is formed in the valve block 56 and the control block 18 to have one end communicated with the second annular groove 88 and the other end communicated with arcuate bores 23 of the timing plate 21, while another conduit 89' is also formed in the valve block 56 and the control block 18 to have one end communicated with the second annular groove 88' and the other end communicated with arcuate bores 23 of the timing plate 21. A central radial bore 90 is formed in the valve block 56 to have one end communicated with the radial bore 49a of the bush 49 and the other end opened at the central point of the valve bore 58 but closed by the outer peripheral wall of the valve spool 59 in a state shown in FIG. 5. A pair of inlet-outlet conduits 91 and 91' are formed in the valve block 56 to have one ends connected with pipes 92 and 92', respectively. The conduit 91 is bifurcated at the other end to have branched openings 93a and 93b the former of which is communicated with the first annular groove 87 and the latter of which is communicated with the recess 84, while the conduit 91' is also bifurcated at the other end to have branched openings 94a and 94b the former of which is communicated with the first annular groove 87' and the latter of which is communicated with the recess 84'. A pair of couplings 95 and 95' are attached to the valve block 56 by means of bolts 96 and 96', respectively, for the purpose of reinforcing the pipes 92 and 92'. A valve casing 97 is securely mounted on the side of the valve block 56 by means of bolts 98 (see FIG. 1) to have therein an axial bore 99 extending in parallel to the valve bore 58 of the valve block 56. A pair of plugs 100 and 100' are threadedly attached to the both ends of the valve casing 97 to close the axial bore 99. The plug 100 is formed with a recess 101 opened axially outwardly and receiving a pilot relief valve 102 which is urged toward an equatorial plane 103 of the valve casing 97 by a compression coil spring 104 housed in the recess 101. The recess 101 is opened at its bottom through a bore 105, which is normally closed by the pilot relief valve 102, but closed by an adjusting screw 106 which is threadedly engaged with the axially outer end of the plug 100 for adjusting a spring force of the compression coil spring 104. Two lock nuts 107 and 108 are threaded to the adjusting screw 106 for fastening the adjusting screw 106 to the plug 100. The plug 100 has a small diameter fore end portion 100a which is formed with a radial bore 109 communicated with the recess 101 and opened at the outer peripheral wall of the small diameter portion 100a. On the other hand, the plug 100' is formed with a recess 101' opened axially outwardly and receiving a pilot relief valve 102' which is urged toward the equatorial plane 103 of the valve casing 97 by a compression coil spring 104' housed in the recess 101'. The recess 101' is opened at its bottom through a bore 105', which is normally closed by the pilot relief valve 102', but closed by an adjusting screw 106' which is threadedly engaged with the axially outer end of the plug 100' for adjusting a spring force of the compression coil spring 104'. Two lock nuts 107' and 108' are threaded to the adjusting screw 106' for fastening the adjusting screw 106' to the plug 100'. The plug 100' has a small diameter fore end portion 100a' which is formed with a radial bore 109' communicated with the recess 101' and opened at the outer peripheral wall of the small diameter portion 100a'. A cylindrical guide 110 is housed in the valve casing 97 in such a manner that the axially outer end of the cylindrical guide 110 remote from the equatorial plane 103 is threaded to the small diameter portion 100a of the plug 100 and the axially inner end of the cylindrical guide 110 adjacent to the equatorial plane 103 is slidably engaged with the inner peripheral wall of the valve casing 97 and the outer wall of the valve block 56. At the longitudinally intermediate portion of the cylindrical guide 110 is formed a radial bore 111 which has a radially outer end communicated with a chamber 112 defined by the cylindrical guide 110 and the valve casing 97 and a radially inner end opened at the inner peripheral wall of the cylindrical guide 110. The inner peripheral wall of the cylindrical guide 110 is formed with a first diameter portion 113a, a second diameter portion 113b having a diameter smaller than that of the first diameter portion 113a, and a third diameter portion 113c having a diameter larger than that of the second diameter portion 113b, which are arranged in this order in a direction away from the equatorial plane 103 of the valve casing 97. A releaf valve 114 is slidably engaged with the second diameter portion 113b and has a flange portion 114a which is engageable with an annular ledge formed between the second diameter portion 113b and the third diameter portion 113c. The releaf valve 114 has a recess 116 opened at its axially outer end remote from the equatorial plane 103 of the valve casing 97 and an axial bore 117 formed at its axially inner end adjacent to the equatorial plane 103 of the valve casing 97. A compression coil spring 118 is accommodated in the recess 116 to have one end engaged with the axially inner end of the plug 100 and the other end engaged with the bottom of the recess 116 so that the releaf valve 114 is urged toward the equatorial plane 103 of the valve casing 97 by the compression coil spring 118 until the flange portion 114a is abutted against the ledge formed between the second diameter portion 113b and the third diameter portion 113c of the inner peripheral wall of the cylindrical guide 110. On the other hand, a cylindrical guide 110' is housed in the valve casing 97' in such a manner that the axially outer end of the cylindrical guide 110' remote from the equatorial plane 103 is threaded to the small diameter portion 100a' of the plug 100' and the axially inner end of the cylindrical guide 110' adjacent to the equatorial plane 103 is slidably engaged with the inner peripheral wall of the valve casing 97 and the outer wall of the valve block 56. At the longitudinally intermediate portion of the cylindrical guide 110' is formed a radial bore 111' which has a radially outer end communicated with a chamber 112' defined by the cylindrical guide 110' and the valve casing 97 and a radially inner end opened at the inner peripheral wall of the cylindrical guide 110'. The inner peripheral wall of the cylindrical guide 110' is formed with a first diameter portion 113a', a second diameter portion 113b' having a diameter smaller than that of the first diameter portion 113a', and a third diameter portion 113c' having a diameter larger than that of the second diameter portion 113b', which are arranged in this order in a direction away from the equatorial plane 103 of the valve casing 97. A relief valve 114' is slidably engaged with the second diameter portion 113b' and has a flange portion 114a' which is engageable with an annular ledge formed between the second diameter portion 113b' and the third diameter portion 113c'. The relief valve 114' has a recess 116' opened at its axially outer end remote from the equatorial plane 103 of the valve casing 97 and an axial bore 117' formed at its axially inner end adjacent to the equatorial plane 103 of the valve casing 97. A compression coil spring 118' is accommodated in the recess 116' to have one end engaged with the axially inner end of the plug 100' and the other end engaged with the bottom of the recess 116' so that the relief valve 114' is urged toward the equatorial plane 103 of the valve casing 97 by the compression coil spring 118' until the flange portion 114a' is abutted against the ledge formed between the second diameter portion 113b' and the third diameter portion 113c' of the inner peripheral wall of the cylindrical guide 110'. A cylindrical shuttle valve 119 is slidably received in the first diameter portion 113a and 113a' of the cylindrical guides 110 and 110' to have both axially outer ends engageable with the relief valves 114 and 114'. An annular projection 120 is integrally formed on the longitudinally central portion of the outer peripheral wall of the shuttle valve 119 to permit the shuttle valve 119 to be movable between the opposing faces of the cylindrical guides 110 and 110'. A pair of conduits 121 and 121' are formed in the valve block 56 to have one ends in communication with the chambers 112 and 112', respectively and the other ends in communication with the second annular grooves 88 and 88', respectively.

As shown in FIGS. 1, 2 and 5, a drain pipe 122 is connected at one end to a conduit 123 which is formed in the control block 18 to be in communication with the annular chamber 47 to enable the pressure oil in the annular chamber 47 to be discharged through the conduit 123 and the drain pipe 122 to a suitable tank not shown in any drawings.

The operation of the drive controlling mechanism thus constructed and arranged in the above embodiment of the present invention will be now described hereinafter in the drawings.

When the pressure oil is introduced into the inlet-outlet conduit 91 through the pipe 92, the pressure oil is separated through the branched openings 93a and 93b. The pressure oil introduced through the branched opening 93a is passed through the first annular groove 87, the first radial bore 66 and admitted into the axial bore 64 to cause the check valve 68 to be moved away from the equatorial plane 63 of the valve spool 59 against the compression coil spring 72 so that the axial bore 64 is brought into communication with the second radial bore 67, thereby causing the pressure oil to be fed to the cylinder bore 15a of the cylinder block 12 through the second annular groove 88, the conduit 89 and the arcuate bores 23 of the timing plate 21. On the other hand, the pressure oil through the branched opening 93b is passed through the recess 84, the radial passage 73 and the axial bore 75 to cause the spherical valve 77 to be moved away from the equatorial plane 63 of the valve spool 59 against the conical compression coil spring 78 so that the pressure oil is introduced into the chamber 74 from the axial bore 75 and thereafter admitted into the recess 81 through the axial bore 76. As a result of this, the valve spool 59 is urged toward the dumper valve 80', during which the pressure oil in the recess 81 of the dumper valve 80' is discharged through a gap defined by the dumper valve 80' and the valve spool 59, the recess 84', the inlet-outlet conduit 91' so that the valve spool 59 is moved toward the dumper valve 80' until the axially outer end of the valve spool 59 is engaged with the bottom of the recess 81 of the dumper valve 80'. The movement of the valve spool 59 causes the branched opening 93a of the inlet-outlet conduit 91 to be brought into communication with the central radial bore 90 through the first annular groove 87, while causing the branched opening 94a of the inlet-outlet conduit 91' to be brought into communication with the second annular groove 88' through the first annular groove 87'. The communication between the branched opening 93a of the inlet-outlet conduit 91 and the central radial bore 90 causes the pressure oil in the first annular groove 87 to be introduced into the bore 49a of the bush 49 through the central radial bore 90 so that the shuttle valve 50 is urged toward the rotary shaft 13 against the compression coil spring 51, thereby communicating the bore 49a of the bush 49 with the intermediate diameter portion 48c of the radial bore 48 while closing the small diameter portion 48b of the radial bore 48 by the large diameter stem 50b of the shuttle valve 50. The pressure oil in the bore 49a of the bush 49 is admitted into the chamber 39 through the intermediate diameter portion 48c of the radial bore 48, the conduits 52 and 33 so that the movable member 26 is moved toward the covering member 27 against the compression coil springs 32. The annular inner discs 37 and the annular outer discs 38 come to be disengaged from each other to allow the rotary shaft 13 to be freely rotated. The pressure oil in the cylinder bores 15a causes the pistons 15 to push the inclined plate 14 so that the rotary shaft 13 is driven for rotation, thereby causing the endless belt 1 to be driven through the reduction gear unit 16, the sprocket wheel 5, the pins 4, 4' and the legs 3, 3'. The pressure oil which has operated the hydraulic motor 11 is discharged from the cylinder bore 15a into the conduit 89' through the arcuate bores 23 of the timing plate 21. The communication between the branched opening 94a of the inlet-outlet conduit 91' and the second annular groove 88' allows the pressure oil in the conduit 89' to be discharged into the pipe 92' through the second annular groove 88', the first annular groove 87', the branched opening 94a, and the inlet-outlet conduit 91'.

When the introduction of the pressure oil into the inlet-outlet conduit 91 through the pipe 92 is stopped, the valve spool 59 is moved toward the dumper valve 80 by the action of the compression coil spring 82' to resume the neutral position as shown in FIG. 5, during which the pressure oil in the recess 81 of the dumper valve 80 is discharged through a gap between the dumper valve 80 and the valve spool 59, the recess 84 and the inlet-outlet conduit 91 to the pipe 92. The movement of the valve spool 59 causes the branched opening 93a of the inlet-outlet conduit 91 not to be brought into communication with the central radial bore 90 through the first annular groove 87, while causing the branched opening 94a of the inlet-outlet conduit 91' not to be brought into communication with the second annular groove 88' through the first annular groove 87'. Under these circumstances, the hydraulic motor 11 continues to be rotated by kinetic energy of a vehicle body which is moving for a short period of time even if no pressure oil is supplied to the hydraulic motor 11, so that the pressure oil is sucked from the conduit 89 and discharged into the conduit 89' by the pumping action of the hydraulic motor 11, causing pressure of the pressure oil in the conduit 89' to be higher than that in the conduit 89. The pressure oil in the conduit 89' is thus introduced into the chamber 112' through the second annular groove 88' and the conduit 121' to cause the shuttle valve 119 and the relief valve 114 to be moved toward the plug 100 against the compression coil spring 118 until the annular projection 120 of the shuttle valve 119 is brought into engagement with the axially inner end of the cylindrical guide 110. At this time, the chamber 112' comes to be in communication with an inner chamber 119a of the shuttle valve 119 so that the pressure oil in the chamber 112' is introduced into the recess 116 of the relief valve 114 through the inner chamber 119a of the shuttle valve 119 and the axial bore 117, thereby urging the pilot relief valve 102 toward the adjusting screw 106 against the compression coil spring 104 to open the bore 105 formed in the plug 100. The pressure oil in the recess 116 is therefore admitted into the chamber 112 through the bore 105, the recess 101 and the radial bore 109, whereupon the back pressure of the pressure oil in the recess 116 is dropped by the throttling action of the axial bore 117 to move the relief valve 114 toward the plug 100 against the compression coil spring 118. As a result, the inner chamber 119a of the shuttle valve 119 is brought into communication with the chamber 112 through the radial bore 111 so that the pressure oil in the inner chamber 119a of the shuttle valve 119 is admitted into the chamber 112 through the radial bore 111. The pressure oil through the radial bores 109 and 111 is thus merged and then introduced into the conduit 89 through the conduit 121 and the second annular groove 88. It is to be understood that the pressure oil in the hydraulic motor 11 is circulated through the previously mentioned routes to prevent cavitation of the hydraulic motor 11. On the other hand, the closing of the central radial bore 90 causes the shuttle valve 50 to be urged toward the central radial bore 90 by the action of the compression coil spring 51 until the taped head 50a of the shuttle valve 50 is brought into engagement with the lower end of the bush 49. At this time, the conduit 52 becomes in communication with the small diameter portion 48b of the radial bore 48 to cause the pressure oil in the chamber 39 to be discharged into the drain pipe 122 through the conduit 33, the conduit 52, the intermediate diameter portion 48c of the radial bore 48, the small diameter portion 48b of the radial bore 48, the grooves 40, 41, the gap 42, the annular groove 43, the axial bore 45, the annular chamber 46, 47 and the conduit 123. The movable member 26 is thus moved toward the rotary shaft 13 by the action of the compression coil springs 32 so that the annular inner discs 37 and the annular outer discs 38 are engaged with each other to brake the rotary shaft 13. If the pressure of the conduit 89 is abnormally dropped, the check valve 68 is moved away from the equatorial plane 63 of the valve spool 59 against the compression coil spring 72 to cause the pressure oil in the inlet-outlet conduit 91 to be admitted into the conduit 89, thereby completely preventing the cavitation of the hydraulic motor 11.

Where the hydraulic motor 11 is rotated in a reverse direction, the pressure oil may be introduced into the pipe 92' and discharged from the pipe 92.

Although detailed descriptions have been made exclusively on the foregoing embodiment of this invention, it should be understood, as indicated hereinbefore, that the preferred embodiment as described and shown herein does not mean in any way limitations of this invention, but on the contrary, variations and modifications with respect to the construction and operation may further be derived by those skilled in the art to which the present invention pertains, whereby the advantageous characteristics of this invention may be realized without departing from the spirit and scope of the invention as set forth hereunto in the appended claims.

What is claimed is:

1. A drive controlling mechanism comprising in combination:

an hydraulic motor including a cylinder block and a rotary shaft extending axially of and positioned within said cylinder block to be engaged with said cylinder block for rotation therewith, a motor housing for accommodating therein said hydraulic motor, a control block securely connected with said motor housing and rotatably receiving one end portion of said rotary shaft, said control block having an axially outer end face and an outer peripheral face, a parking brake means detachably received within the axially outer half of said control block for braking said rotary shaft, a parking brake inlet-outlet conduit formed in said control block for introducing and discharging fluid under pressure to and from said parking brake means for actuating and de-actuating said parking brake means, a control valve means detachably mounted on the outer peripheral face of said control block in fluid communication with said parking brake means through a radial bore formed in said control block, said radial bore being in fluid communication with said parking brake inlet-outlet conduit, so that the running of said hydraulic motor will be controlled by said control valve means, and a pair of inlet-outlet conduits for introducing and discharging said pressure fluid to and from said control valve means.

2. A drive controlling mechanism as claimed in claim 1, in which said control valve means has an axis which extends within a plane which extends substantially perpendicular to the axis of said rotary shaft.

3. A drive controlling mechanism as claimed in claim 1, in which said control valve means includes a first change-over valve in communication with said inlet-outlet conduits to stop introduction and discharge of said oil under pressure to and from said hydraulic motor upon stoppage of the introduction of said pressure oil into said hydraulic motor, and a second change-over valve in communication with said first change-over valve to circulate said pressure oil within said hydraulic motor upon stoppage of introduction of said pressure oil into said hydraulic motor.

* * * * *